United States Patent [19]

Yamamoto et al.

[11] Patent Number: 5,459,597
[45] Date of Patent: Oct. 17, 1995

[54] LIQUID CRYSTAL CELL CLUSTER AND METHOD OF MANUFACTURING LIQUID CRYSTAL CELL

[75] Inventors: Kotarou Yamamoto; Yoshinobu Takagi; Tomoko Kanno; Nobuhiro Sato, all of Fukushima; Kazuo Matsushita, Tokyo, all of Japan

[73] Assignee: Nanox Co., Ltd., Japan

[21] Appl. No.: 109,703

[22] Filed: Aug. 20, 1993

[30] Foreign Application Priority Data

Aug. 21, 1992 [JP] Japan ................... 4-245628

[51] Int. Cl.$^6$ .................... G02F 1/1339; C09K 19/52
[52] U.S. Cl. ...................... 359/80; 252/299.01
[58] Field of Search ................ 252/299.01; 359/53, 359/80

[56] References Cited

U.S. PATENT DOCUMENTS

| | | | |
|---|---|---|---|
| 3,645,604 | 2/1972 | Ngo | 359/53 X |
| 4,451,122 | 5/1984 | Oh et al. | 359/54 X |
| 4,656,874 | 4/1987 | Kulig | 73/861.55 |
| 4,917,473 | 4/1990 | Watanabe | 359/75 X |
| 5,020,883 | 6/1991 | Era et al. | 359/104 X |
| 5,237,440 | 8/1993 | Watanabe et al. | 359/90 |

FOREIGN PATENT DOCUMENTS

| | | |
|---|---|---|
| 0113023 | 9/1980 | Japan . |
| 0163512 | 12/1980 | Japan . |
| 0283314 | 12/1987 | Japan . |

*Primary Examiner*—Cynthia Harris
*Attorney, Agent, or Firm*—Merchant, Gould, Smith, Edell, Welter & Schmidt

[57] ABSTRACT

A liquid crystal cell cluster has a pair of glass plates bonded to each other and a sealant disposed between the glass plates and defining a matrix of spaces in horizontal rows and vertical columns beteen the glass plates. The spaces has respective inlets for introducing a liquid crystal into the spaces. The spaces in each of the vertical columns are held in communication with each other through the respective inlets thereof. The liquid crystal cell cluster also includes a horizontal row of liquid crystal reservoirs defined between the glass plates above the uppermost horizontal row of the spaces and held in communication with the respective spaces in the uppermost horizontal row.

12 Claims, 6 Drawing Sheets

LIQUID CRYSTAL CELL CLUSTER AND METHOD OF MANUFACTURING LIQUID CRYSTAL CELL

BACKGROUND OF THE INVENTION

1. Field of the Invention

The present invention relates to a liquid crystal cell cluster for use as an intermediate product in the manufacture of liquid crystal cells, and a method of manufacturing liquid crystal cells from such a liquid crystal cell cluster.

2. Description of the Relevant Art

There are widely used liquid crystal display units comprising a liquid crystal sealed between two glass plates each carrying electrodes formed by a thin film fabrication process such as evaporation. When a voltage is applied by electrodes to liquid crystal molecules that are uniformly aligned, the liquid crystal molecules are oriented into a pattern depending on the electrodes for partly blocking transmission of light through the liquid crystal.

One conventional process of manufacturing a liquid crystal cell for use in the liquid crystal display unit will be described below with reference to FIGS. 6(a) through 6(f) of the accompanying drawings.

First, a liquid crystal cell cluster 100 as shown in FIG. 6(a) is prepared which comprises two glass plates 101 joined to each other with a matrix of spaces 103 defined therebetween in horizontal rows and vertical columns with a sealant 102, each of the spaces 103 having an inlet 104. Each of the glass plates 101 has electrodes 105 and terminals 106 formed thereon in association with the spaces 103.

Then, as shown in FIG. 6(b), the liquid crystal cell cluster 100 is cut off horizontally into a plurality of subclusters 100a each composed of a horizontal array of spaces 103. The inlets 104 of the spaces 103 are open on one side of each of the subclusters 100a.

Thereafter, while the spaces 103 of each of the subclusters 100a are being evacuated, the inlets 104 are immersed in a liquid crystal 107, allowing the spaces 103 to be filled with the liquid crystal 107 as shown in FIG. 6(c). Then, the inlet 104 are sealed as shown in FIG. 6(d), after which the subcluster 100a is cut off into individual cells 100b as shown in FIG. 6(e). Thereafter, as shown in FIG. 6(f), polarizers 108 are attached to the respective opposite surfaces of each of the cells 100b, thus completing a liquid crystal cell 110.

According to the above conventional process of manufacturing a liquid crystal cell, however, it is not possible to introduce the liquid crystal into all the spaces 103 of the liquid crystal cell cluster 100 in one operation. Since the liquid crystal cell cluster 100 is first cut off horizontally into a plurality of subclusters 100a each having inlets 104 opening on one side, the efficiency with which liquid crystal is introduced into the spaces 103 is relatively low.

Furthermore, inasmuch as the liquid crystal cell cluster 100 is cut off at an early stage, subsequent steps such as of attaching polarizers 108 are quite cumbersome to carry out.

When the liquid crystal 107 is introduced into the spaces 103, the liquid crystal 107 finds its way into outer sides of the spaces 103, i.e., the portions of the spaces 103 where the terminals 106 are formed. Consequently, it is necessary to clean off those portions to remove the liquid crystal that has attached.

SUMMARY OF THE INVENTION

It is an object of the present invention to provide a liquid crystal cell cluster from which individual liquid crystal cells can efficiently be manufactured within a short period of time.

Another object of the present invention is to provide a method of manufacturing individual liquid crystal cells from a liquid crystal cell cluster efficiently within a short period of time.

According to the present invention, there is provided a liquid crystal cell cluster comprising a pair of glass plates bonded to each other, and a sealant disposed between the glass plates and defining a matrix of spaces in horizontal rows and vertical columns between the glass plates, the spaces having respective inlets for introducing a liquid crystal into the spaces, the spaces in each of the vertical columns being held in communication with each other through the respective inlets thereof.

According to the present invention, there is also provided a liquid crystal cell cluster comprising a pair of glass plates spaced from each other and having a matrix of cell regions in horizontal rows and vertical columns, the cell regions comprising respective spaces defined between the glass plates for being filled with a liquid crystal and respective inlets associated with the spaces, respectively, for introducing the liquid crystal into the respective spaces, the spaces of the cell regions in each of the vertical columns being held in communication with each other through the respective inlets thereof.

According to the present invention, there is further provided a method of manufacturing liquid crystal cells from a liquid crystal cell cluster having a pair of glass plates bonded to each other and a sealant disposed between the glass plates and defining a matrix of spaces in horizontal rows and vertical columns between the glass plates, the spaces having respective inlets for introducing a liquid crystal into the spaces, the spaces in each of the vertical columns being held in communication with each other through the respective inlets thereof, the method comprising the steps of placing a container containing a liquid crystal and the liquid crystal cell cluster in a chamber, evacuating the chamber, immersing a lower end of the liquid crystal cell cluster in the liquid crystal in the container, introducing an atmospheric pressure into the chamber to allow the liquid crystal to fill the spaces in the liquid crystal cell cluster through the respective inlets, attaching polarizers to cell regions of the liquid crystal cell cluster which correspond to the respective spaces, cutting off the liquid crystal cell cluster, and sealing the inlets of the cell regions.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

Figure 1:
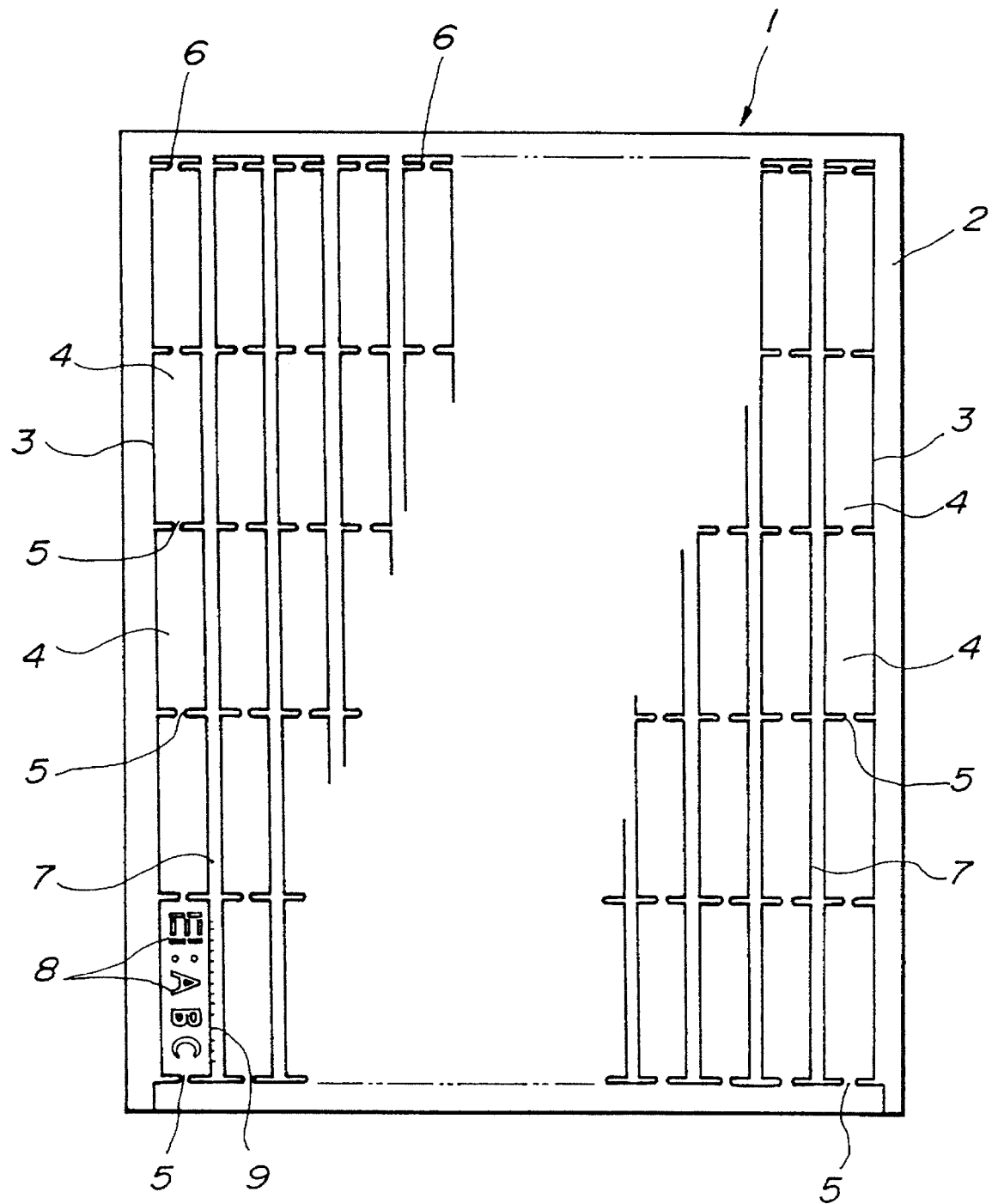
FIG. 1 is a fragmentary plan view of a liquid crystal cell cluster according to the present invention.
Figure 2:
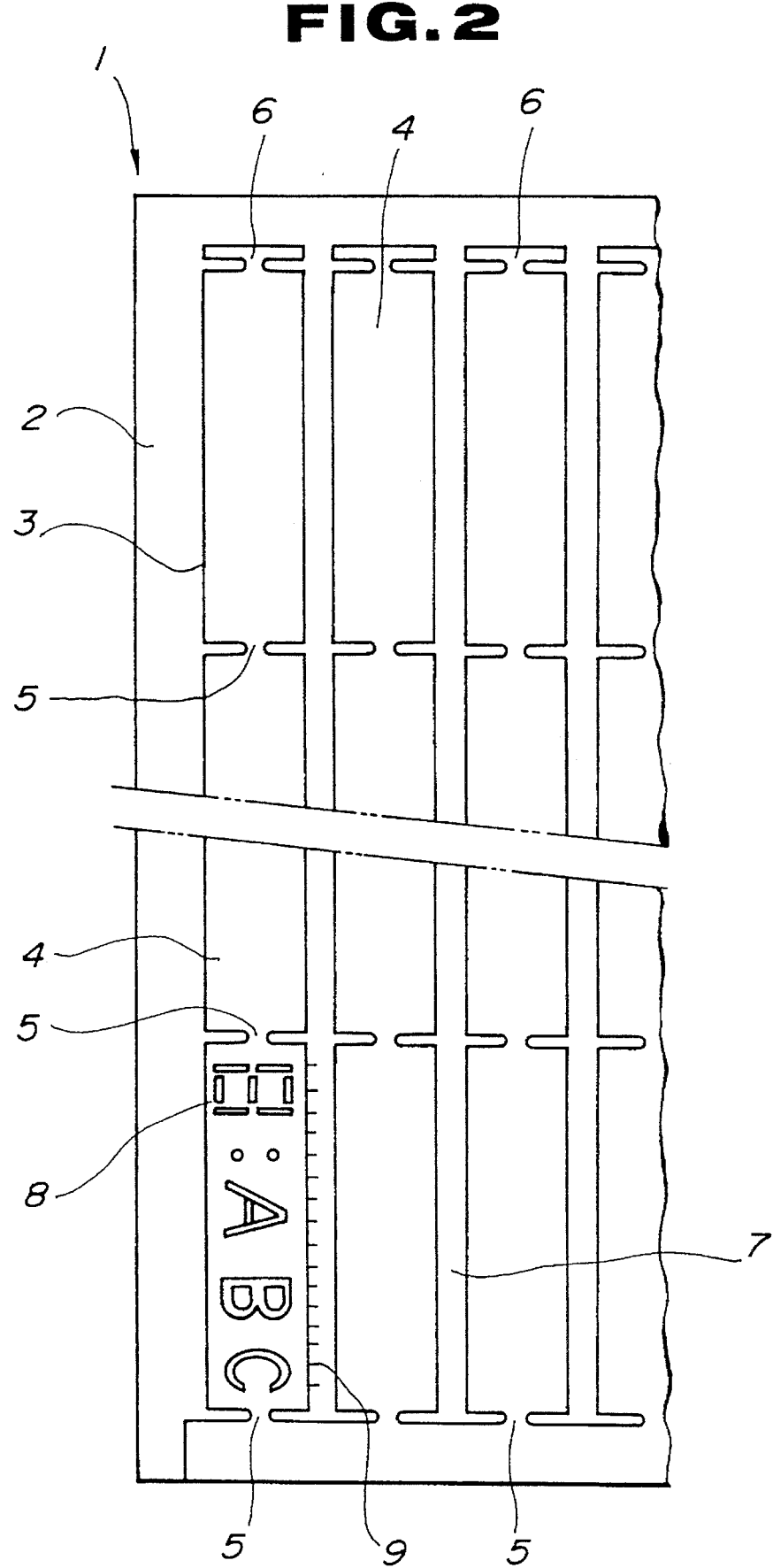
FIG. 2 is an enlarged fragmentary plan view of the liquid crystal cell cluster.
Figure 3:
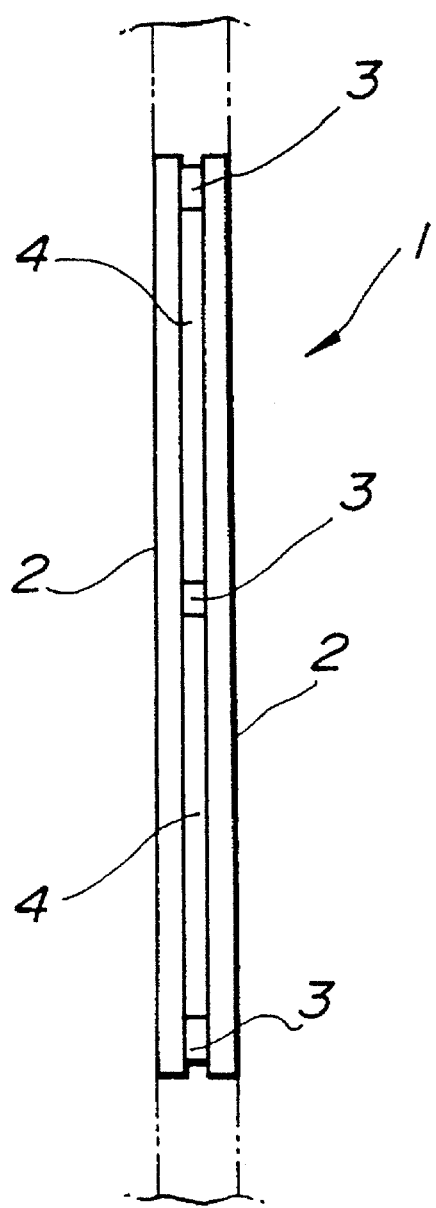
FIG. 3 is an enlarged fragmentary vertical cross-sectional view of the liquid crystal cell cluster.

As shown in FIGS. 1 through 3, a liquid crystal cell cluster 1 according to the present invention comprises two glass plates 2 bonded to each other with a matrix of spaces 4 defined therebetween in horizontal rows and vertical columns with a sealant 3. Each of the spaces 4 has an inlet 5 opening at a lower end thereof. The spaces 4 in each vertical column are held in communication with each other by their inlets 5. The regions of the liquid crystal cell cluster 1 in which the respective spaces 4 are defined serve as cell regions, which will subsequently be cut off into liquid crystal cells as described later on.

The liquid crystal cell cluster 1 also includes a horizontal array of liquid crystal reservoirs 6 defined between the glass plates 2 above the uppermost horizontal row of spaces 4. Each of the liquid crystal reservoirs 6 is shown as being of a flat shape as wide as one of the spaces 4, but may be of a circular shape or any other desired shape.

The liquid crystal cell cluster 1 also has a plurality of spaces 7 defined laterally outside of the spaces 4 between the glass plates 2 with the sealant 3. The spaces 7 are formed at the same time that the spaces 4 are formed between the glass plates 2 with the sealant 3. These spaces 7 are isolated from, i.e., not held in communication with, the spaces 4.

The glass plates 2 have electrodes 8 and terminals 9 formed thereon. The electrodes 8 and terminals 9 may be formed of ITO (indium tin oxide) or the like by sputtering, CVD (chemical vapor deposition), screen printing, or the like. The electrodes 8 are positioned in each of the spaces 4, and the terminals 9 are associated with each of the spaces 4 and positioned in an adjacent one of the spaces 7. While the electrodes 8 and the terminals 9 are shown as being associated with one of the spaces 4, they are actually combined with each of the spaces 4.

A process of manufacturing a liquid crystal cell from the liquid crystal cell cluster 1 will be described below with reference to FIGS. 4(a) through 4(f) and 5.

Figure 4A:
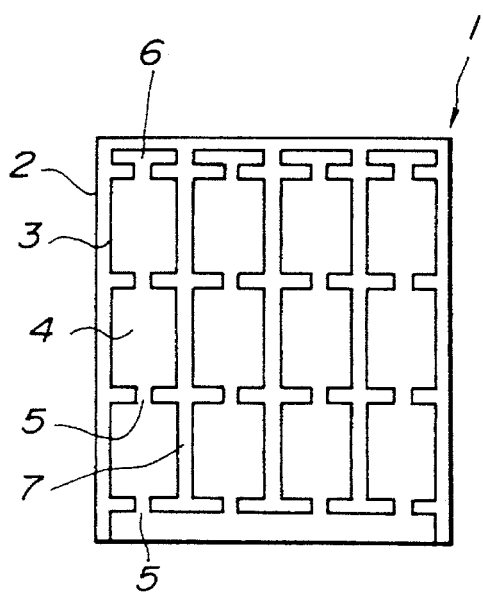
FIGS. 4(a) through 4(f) are views illustrative of a sequence of steps for manufacturing a liquid crystal cell from the liquid crystal cell cluster.
Figure 4B:
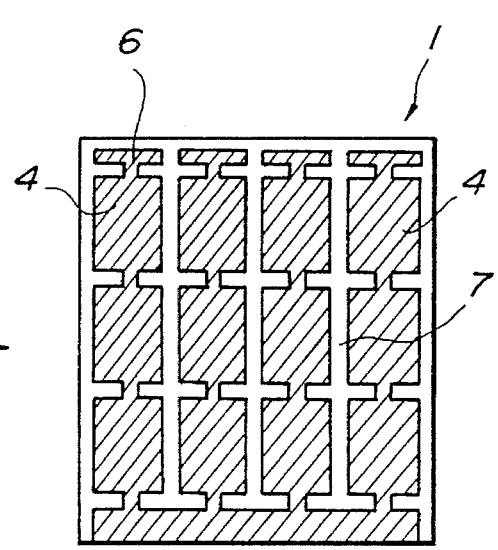

First, the spaces 4 in the liquid crystal cell cluster 1 as shown in FIG. 4(a) are filled with a liquid crystal 10 as shown in FIG. 4(b).

Figure 5:
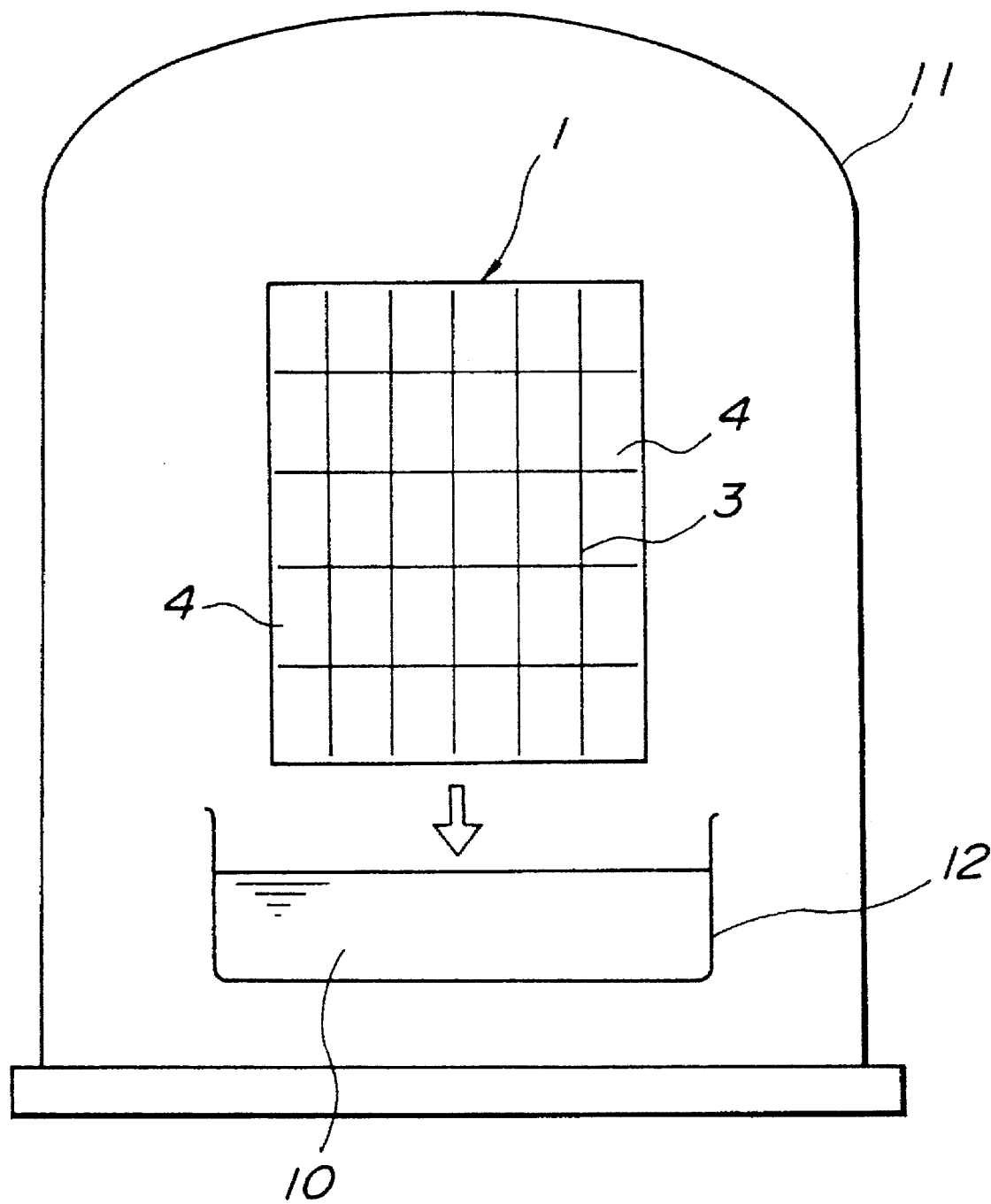
FIG. 5 is a schematic elevational view showing a step of introducing a liquid crystal into the liquid crystal cell cluster.
Figure 6:
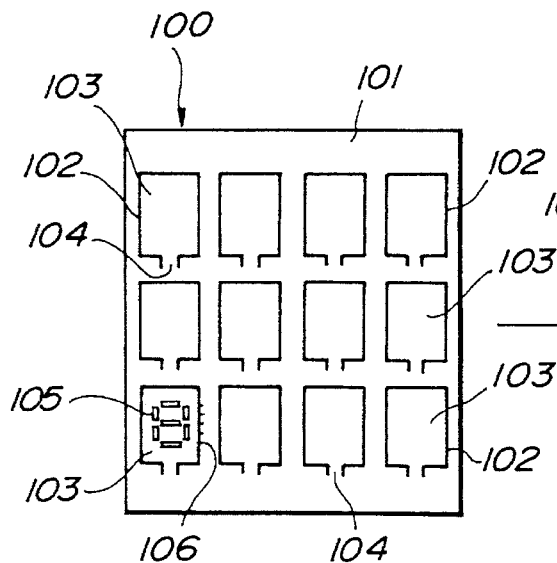
FIGS. 6(a) through 6(f) are views illustrative of a conventional sequence of steps for manufacturing a liquid crystal cell from a liquid crystal cell cluster.
Figure 6:
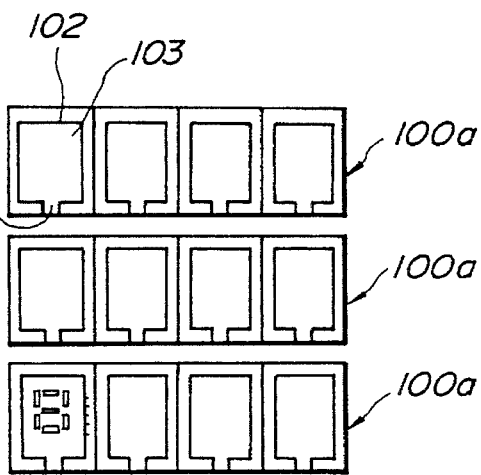
Figure 6:
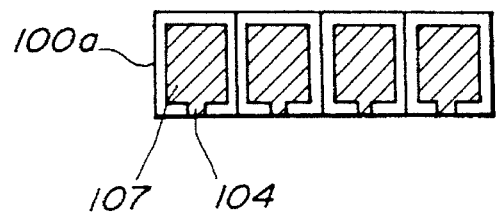
Figure 6:
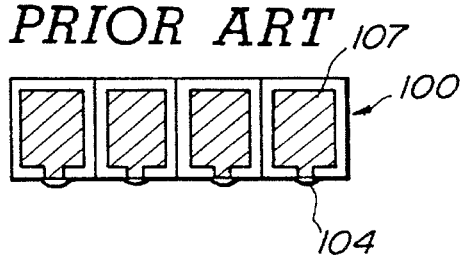
Figure 6:
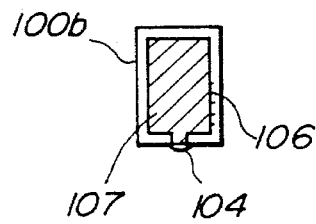
Figure 6:
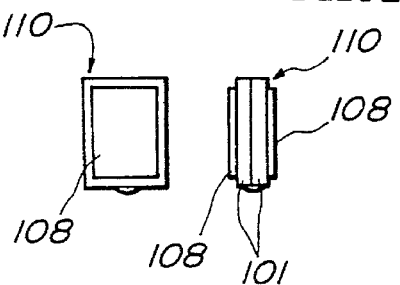

More specifically, as shown in FIG. 5, the liquid crystal cell cluster 1 and a container 12 containing the liquid crystal 10 are placed in a chamber 11. Then, the chamber 11 is evacuated, and thereafter the lower end of the liquid crystal cell cluster 1 is immersed in the liquid crystal 10 in the container 12. Then, the evacuated condition in the chamber 11 is removed, i.e., the atmospheric pressure is introduced into the chamber 11. Since the spaces 4 remain evacuated and the liquid crystal cell cluster 1 is surrounded by the atmospheric pressure within the chamber 11, the liquid crystal 10 is drawn under suction into the spaces 4 through the lowermost row of inlets 5.

Inasmuch as the spaces 4 in each of the vertical columns communicate with each other through their corresponding inlets 5, the liquid crystal 10 is introduced upwardly into the spaces 4 successively from the lowermost space 4 to the uppermost space 4.

When the liquid crystal 5 is introduced into the spaces 4, any air which may remain in the spaces 4 is forced to flow into the liquid crystal reservoirs 6 above the uppermost spaces 4. Accordingly, the spaces 4 are quickly filled with the liquid crystal 10.

While the liquid crystal 5 is being drawn into the spaces 4, no liquid crystal enters the spaces 7 as the spaces 7 are isolated from the spaces 4.

Figure 4C:
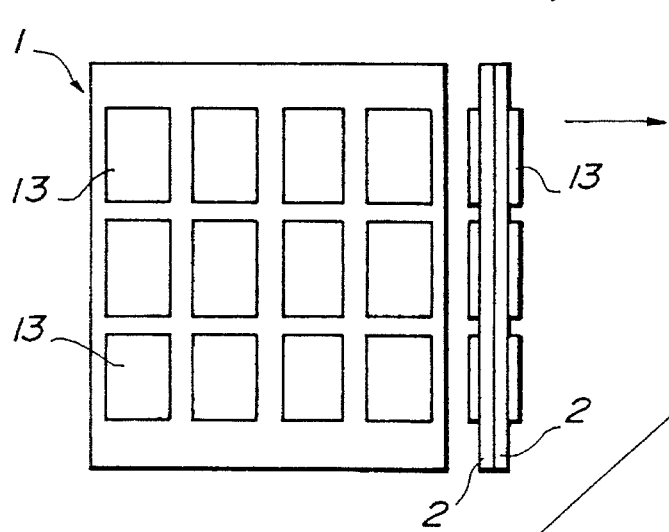
Figure 4D:
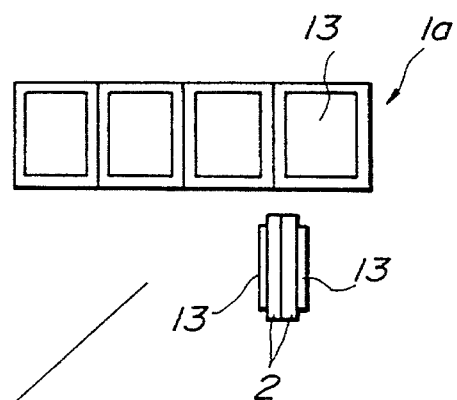
Figure 4E:
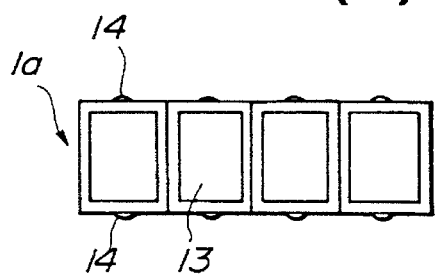
Figure 4F:
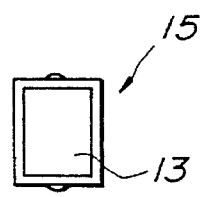

After the spaces 4 have been filled with the liquid crystal 10, the liquid crystal cell cluster 1 is taken out from the chamber 11. Then, as shown in FIG. 4(c), polarizers 13 are attached to the respective opposite surfaces of each of the cell regions of the liquid crystal cell cluster 1. Thereafter, as shown in FIG. 4(d), the liquid crystal cell cluster 1 with the liquid crystal 10 filled and the polarizers 13 attached is cut off horizontally into a plurality of horizontal subclusters 1a each composed of a horizontal array of cell regions each filled with the liquid crystal 10 and combined with the polarizers 13. Then, the inlets 5 on opposite sides of each of the subclusters 1a are sealed with glass 14 as shown in FIG. 4(e). Finally, each of the subclusters 1a is cut off into individual liquid crystal cells 15 each comprising the liquid crystal 10 sandwiched between the glass plates 2 that are provided with the electrodes 8, the terminals 9, and the polarizers 13.

With the arrangement of the present invention, since the spaces 4 in each vertical column are held in communication with each other through the inlets 5, all the spaces 4 in the liquid crystal cell cluster 1 can be filled with the liquid crystal 10 in one operation before the liquid crystal cell cluster 1 is cut off into a plurality of subclusters 1a. Therefore, liquid crystal cells 15 can be manufactured from the liquid crystal cell cluster 1 with high efficiency.

When the liquid crystal 10 is introduced into the spaces 4, any air which may have remained in the spaces 4 is drawn into the liquid crystal reservoirs 6 above the uppermost row of spaces 4. Therefore, air bubbles which would retard smooth introduction of the liquid crystal 10 into the spaces 4 are removed from the spaces 4, the liquid crystal 10 can be introduced into the spaces 4 in a relatively short period of time. Specifically, in an experiment, it took only one hour to complete the introduction of the liquid crystal 10 into all the spaces 4 with the liquid crystal reservoirs 6 included, whereas it took six hours to introduce the liquid crystal 10 into all the spaces 4 with the liquid crystal reservoirs 6 not included.

As no liquid crystal enters the spaces 7 where the terminals 9 are positioned, it is not necessary to clean off the terminals 9 to remove any liquid crystal which would otherwise be attached to the terminals 9. As a consequence, the manufacturing process is simplified and rendered less expensive.

The liquid crystal cell cluster 1 is not required to be cut off into smaller subclusters and cell regions until after the polarizers 13 are attached. This is advantageous in that the liquid crystal cell cluster 1 which remains uncut throughout the major steps of the manufacturing process is relatively large in size and hence can be handled with ease, resulting in a simpler operation procedure, a reduced number of and a simpler sequence of manufacturing steps, and hence a reduced manufacturing cost.

Although there has been described what is at present considered to be the preferred embodiment of the invention, it will be understood that the invention may be embodied in other specific forms without departing from the essential characteristics thereof. The present embodiment is therefore to be considered in all respects as illustrative, and not restrictive. The scope of the invention is indicated by the appended claims rather than by the foregoing description.

What is claimed is:

1. A liquid crystal cell cluster comprising:

a pair of glass plates bonded to each other; and a sealant disposed between said glass plates and defining a matrix of spaces in horizontal rows and vertical columns between said glass plates, said spaces having respective inlets defining respective conduits extending between adjacent vertical spaces for introducing a liquid crystal into the spaces;

said spaces in each of the vertical columns being held in communication with each other through the respective inlets thereof.

2. A liquid crystal cell cluster according to claim 1, further comprising a horizontal row of liquid crystal reservoirs defined between said glass plates above the uppermost horizontal row of said spaces and held in communication with the respective spaces in said uppermost horizontal row.

3. A liquid crystal cell cluster according to claim 1, wherein said sealant further define a plurality of second spaces between said glass plates, each of said second spaces being positioned outside of one of said spaces.

4. A liquid crystal cell cluster according to claim 3, wherein said second spaces are isolated from said spaces.

5. A liquid crystal cell cluster according to claim 3, further comprising terminals associated with each of said spaces and positioned in each of said second spaces.

6. A liquid crystal cell cluster comprising a pair of glass plates spaced from each other and having a matrix of cell regions in horizontal rows and vertical columns, said cell regions comprising respective spaces defined between said glass plates for being filled with a liquid crystal and respective inlets associated with said spaces, respectively, for introducing the liquid crystal into the respective spaces, said spaces of the cell regions in each of the vertical columns being held in communication with each other through the respective inlets thereof, wherein said inlets communicating between said cell regions define closed passages between said cell regions.

7. A liquid crystal cell cluster according to claim 6, further comprising a horizontal row of liquid crystal reservoirs defined between said glass plates above the uppermost horizontal row of said spaces and held in communication with the respective spaces in said uppermost horizontal row.

8. A liquid crystal cell cluster according to claim 6, wherein said glass plates define a plurality of second spaces therebetween, each of said second spaces being positioned outside of one of said spaces.

9. A liquid crystal cell cluster according to claim 8, wherein said second spaces are isolated from said spaces.

10. A liquid crystal cell cluster according to claim 8, further comprising terminals associated with each of said spaces and positioned in each of said second spaces.

11. A method of manufacturing liquid crystal cells from a liquid crystal cell cluster having a pair of glass plates bonded to each other and a sealant disposed between the glass plates and defining a matrix of spaces in horizontal rows and vertical columns between the glass plates, the spaces having respective inlets for introducing a liquid crystal into the spaces, the spaces in each of the vertical columns being held in communication with each other through the respective inlets thereof, said inlets defining passages between said adjacent vertical spaces, said method comprising the steps of:

placing a container containing a liquid crystal and the liquid crystal cell cluster in a chamber;

evacuating said chamber;

immersing a lower end of the liquid crystal cell cluster in the liquid crystal in the container;

introducing an atmospheric pressure into said chamber to allow the liquid crystal to fill the spaces in the entire liquid crystal cell cluster through the respective inlets;

attaching polarizers to cell regions of the liquid crystal cell cluster which correspond to the respective spaces;

cutting off the liquid crystal cell cluster; and sealing the inlets of said cell regions.

12. A method according to claim 11, wherein said step of cutting off the liquid crystal cell cluster comprises the steps of:

cutting off the liquid crystal cell cluster into a plurality of subclusters; and cutting off each of the subclusters into individual liquid crystal cells.

* * * * *